United States Patent [19]

Ziegler et al.

[11] 3,736,026
[45] May 29, 1973

[54] DEVICE FOR POSITIONING A SEATING ARRANGEMENT ESPECIALLY IN MOTOR VEHICLES

[75] Inventors: Horst Ziegler; Albert Thill, both of Wolfsburg, Germany

[73] Assignee: Volkswagenwerk Aktiengesellschaft, Wolfsburg, Germany

[22] Filed: June 14, 1971

[21] Appl. No.: 152,750

[30] Foreign Application Priority Data

June 25, 1970 Germany.....................P 20 31 382.0

[52] U.S. Cl.........................................297/379, 5/43
[51] Int. Cl. .................................................B60n 1/06
[58] Field of Search......................297/379, 378, 367; 5/43, 57 B, 37

[56] References Cited

UNITED STATES PATENTS

| | | | |
|---|---|---|---|
| 3,549,202 | 12/1970 | Boschen et al. | 297/379 |
| 3,515,433 | 6/1970 | Tabor | 297/379 X |
| 3,628,831 | 12/1971 | Close | 297/379 |
| 3,473,176 | 10/1969 | Taylor | 297/379 X |
| 1,702,284 | 2/1929 | Thien | 5/37 R |

Primary Examiner—Francis K. Zugel
Attorney—Ernest F. Marmorek

[57] ABSTRACT

In a vehicle, especially in a motor vehicle, a seat arrangement having a seat portion and a backrest portion, the latter being tiltable between an upright sitting and a forwardly tilted "getting-in" position, the backrest has a hollow frame lower portion pivotally mounted, a lever having one end secured to the pivot point and protruding into the hollow portion, it has formed at two opposite sides thereof abutting surfaces cooperating with abutting surfaces formed on the hollow portion, a latching member pivotally mounted adjacent the protruding end portion of the lever, a spring forcing an abutting surface of the lever into engagement with one of the abutting surfaces on the end portion lying adjacent thereto and thereby forcing the other of the abutting surfaces of the lever end portion into engagement with the abutting surface on the hollow portion adjacent thereto thereby latching the backrest in an upright position, an operating handle secured to the latching member for releasing the latching member from the latched position in the upright position, a hook portion formed on the end portion of the lever and hook portion formed on the latching member for engaging the hook portion of the lever in the tilted position of the backrest, the handle serving to disengage the latching when operated.

4 Claims, 2 Drawing Figures

Patented May 29, 1973

3,736,026

INVENTORS.
HORST ZIEGLER
and ALBERT THILL
BY

Ernest P. Marmorek,
THEIR ATTORNEY.

DEVICE FOR POSITIONING A SEATING ARRANGEMENT ESPECIALLY IN MOTOR VEHICLES

FIELD OF THE INVENTION

The present invention relates to a device for positioning the seating arrangement in motor vehicles having a seat portion and a back rest which after the release of a latching mechanism can be forwardly tilted from a sitting into a "getting-in" position and in which the back rest has a side frame which is pivotally mounted about a point of rotation lying along a common axis of rotation and in which the release of the latching mechanism is affected by means of a handle provided on the side frame.

BACKGROUND OF THE INVENTION

The known tiltable seat arrangements in motor vehicles possess a disadvantage in that the back rest after having been tilted into its forward position can fall back by itself into the sitting position. Also the forwardly tilted back rest is frequently used by the people sitting in the back of the car as a support to which they hold on during their getting-in and out of the car, therefore, it would be desirable that the back rest could be arrested or locked in its forwardly tilted position so that it could provide sufficient support.

BRIEF SUMMARY OF THE INVENTION

It is, therefore, an object of the present invention to provide a forwardly tiltable seat arrangement in motor vehicles wherein the back rest, after having been forwardly tilted, can be locked in such tilted position.

According to the present invention the seat arrangement having a seat portion and a backrest which is tiltable between a sitting and a "getting-in" position, the backrest comprising a side frame supported about a pivot point and to which a lever is coupled which does not undergo forward and backward tilting with the backrest, the side frame comprising abutting surfaces which cooperate with abutting surfaces formed on opposite sides at and end of the lever, and a latching member which can be pivoted into latching position with the end of the lever forcing it into rigid abutment with the side walls of the frame in the upright position, an operating handle acting on the latching member and releasing same from the latched position, in the tilted position positive latches formed on the lever and on the latching member engage each other and secure the backrest in the tilted position, the operating handle acting again to release such positive engagement of the latches.

According to the present invention the latches are hook-shaped and provide for latching the backrest in the titled position to prevent self-release of the backrest.

According to the present invention the lever is a double-armed lever being coupled at one arm thereof with the hollow portion of the backrest by means of the pivot point.

According to the present invention the hollow lower portion or side frame of the backrest is formed as a box girder into which one arm of the lever protrudes and in which the latching member is pivotally mounted.

The invention also provides that the lever at the other arm thereof is mounted on a member serving for the adjustment of the backrest.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figure 1:
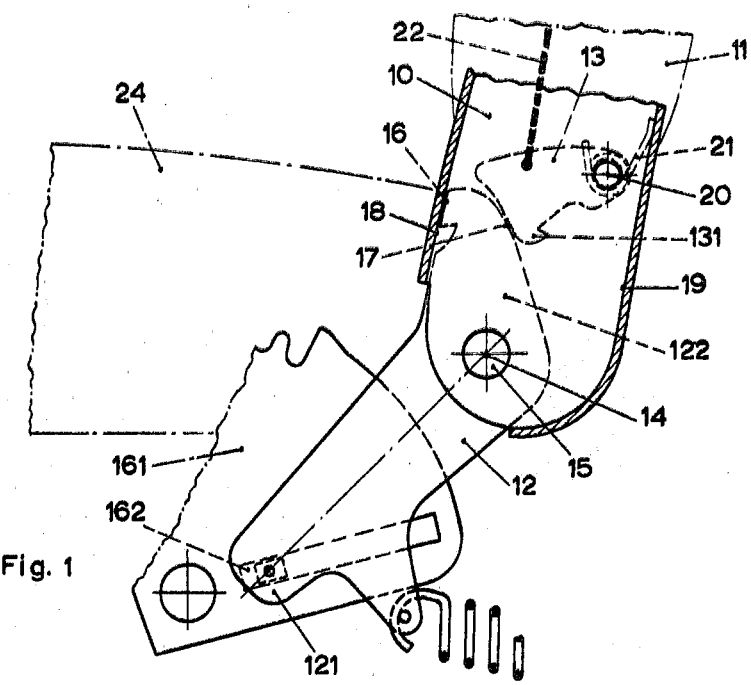
FIG. 1 is a schematic representation, in side view, partly in section, of the positioning device showing the backrest of the seat arrangement in its sitting or upright position.
Figure 2:
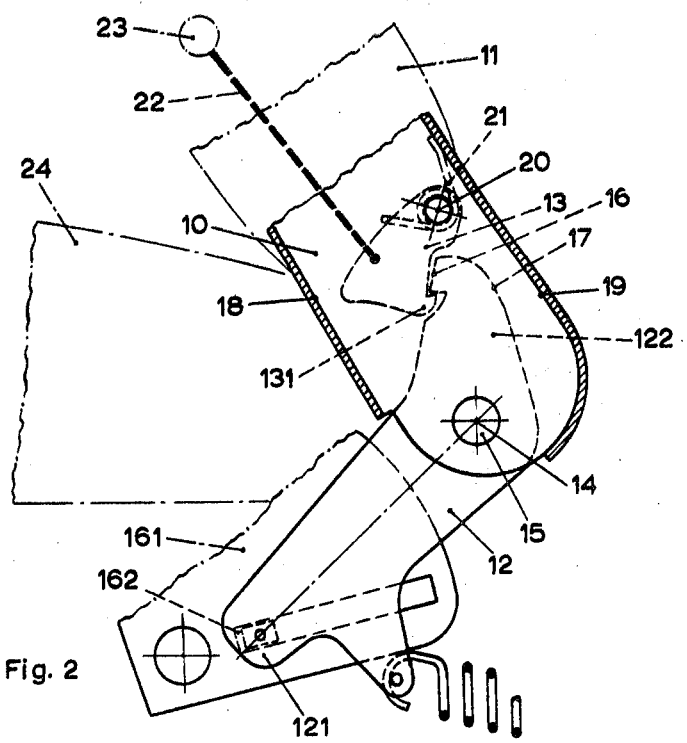
FIG. 2 is a schematic representation, in side view, partly in section of the positioning device according to FIG. 1, showing the backrest of the seating arrangement in a "getting-in" position.

With reference to FIGS. 1 and 2, it is seen that the positioning device according to the present invention comprises a side frame 10 formed in its lower portion as a box girder, a backrest 11, and a double armed lever 12 and a latching device 13.

The side frame 10 and also the lever 12 are pivotally mounted on a stud 15 lying on the common axis of rotation 14 of the backrest 11 and seat portion 24.

While lever 12 with its free end 121 is supported on a support 162 which comprises an adjusting member 161 serving to position the backrest 11 into its inclined or tilted position, the portion 122 of the lever 12 projects into a hollow space formed by the box girder-like side frame 10 and has abutting surfaces 16, 17, formed thereon which cooperate with side surface of the box girder or side frame 10, particularly surface portions 18, 19.

The latching member 13 is pivotally supported about a point of rotation 20 in the hollow space of the side frame 10 in such a manner that during the tilting movements of the backrest 11 it is automatically moved by means of a spring 21 into the region swept by lever 12 and, on the other hand, it can be moved out of such region by means of a handle 23 operated by a cable line 22.

FIG. 1 illustrates the positioning arrangement showing the backrest 11 in the socalled "sitting" position. Under these conditions the abutting surface 16 of lever 12 facing the seat 24 abuts on the associated surface 18 and the latching mechanism 13 is pivoted to a position between the supporting surface 17 lying on the side of the lever 12 which is further away from said seat 24 and between the abutting surface 19 associated with the abutting or supporting surface 17 and in which position it is supported by the special formation of the latching member 13 and by the force of a spring 21, whereby the lever 12 is securely held against the side frame 10 and forms therewith a rigid unit.

Should the backrest 11 be tilted forwardly into its "getting-in" position illustrated in FIG. 2, then the latching member 13 should be pivoted out of its position shown in FIG. 1 by means of the handle 23.

With reference to FIG. 2 it is seen that the latching member 13 in the "getting-in" or tilted position of the seat arrangement, and more particularly, of the backrest 11, lies between the abutting surface 16 formed on the side of the lever 12 facing the seat 24 and between its cooperating abutting surface 18. A self return of the backrest 11 into its upright position is prevented since the latching member 13 is also provided with a hooked portion 131 which engages a similarly hook-shaped portion formed on the lever 12 on its side facing the seat.

Should the backrest 11 be brought into the sitting or upright position, it should be pivoted further down toward the seat 24 until the abutting surface 17 formed on the side of the lever 12 further away from the seat 24 abuts against surface 19. As a result, the hook 131 of the latching member 13 can become disengaged from the lever 12 so that the latching member 13 can now be moved with the handle 23 out of its latched position and release the backrest 11 into its sitting or upright position.

It is within the scope of the present invention to provide other abutting surfaces than the abutting surface 19 when the backrest 11 is tilted forwardly toward the seat 24.

From the above, it is apparent that although the invention has been described hereinbefore with respect to a certain specific embodiment thereof, it is evident that many modifications and changes may be made without departing from the spirit of the invention. Accordingly, by the appended claims, we intend to cover all such modifications and changes as fall within the true spirit and scope of this invention.

We claim:

1. In a seat arrangement especially for use in a motor vehicle,
    in combination
    a seat portion and a backrest portion,
    said backrest portion including a hollow frame portion, said backrest portion being tiltable between an upright sitting position and a forwardly tilted getting-in position,
    supporting lever means protruding into said frame portion,
    means for pivotably mounting said frame portion on said supporting lever means in such a manner that one side of said supporting lever means abuts in the upright position of said backrest against an inner surface of said hollow frame portion, said one side of said supporting lever means having a hook-shaped camming recess,
    a latching member pivotably mounted on said frame portion in operative proximity to said supporting lever means,
    said latching member having a hook-shaped portion engageable with said hook-shaped camming recess of said supporting lever means when said backrest is tilted into said getting-in position, and an abutting surface engageable with the other side of said supporting lever means when said backrest is in its upright position, and
    operating means coupled to said latching member for moving the latter into and, respectively from engagement with said supporting lever means.

2. The combination as claimed in claim 1, wherein said hollow frame portion is formed as a box girder and said abutting surfaces on said hollow portion are side walls of said box girder.

3. The combination as claimed in claim 1 further including resilient means for biasing said latching member against said supporting lever means.

4. The combination as claimed in claim 1, wherein said operating means includes a handle secured to one side of said backrest portion.

* * * * *